(12) United States Patent
Hamai et al.

(10) Patent No.: US 7,491,071 B2
(45) Date of Patent: Feb. 17, 2009

(54) SHIELD END PROCESSING STRUCTURE

(75) Inventors: Tsuyoshi Hamai, Makinohara (JP);
Akihiro Nagao, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/938,548

(22) Filed: Nov. 12, 2007

(65) Prior Publication Data
US 2008/0113559 A1 May 15, 2008

(30) Foreign Application Priority Data
Nov. 10, 2006 (JP) .............................. 2006-304653

(51) Int. Cl.
*H01R 4/66* (2006.01)
*H01R 13/648* (2006.01)
(52) U.S. Cl. ........................................ 439/98; 439/882
(58) Field of Classification Search ................ 439/98, 439/99, 882
See application file for complete search history.

(56) References Cited

U.S. PATENT DOCUMENTS

| | | | | |
|---|---|---|---|---|
| 5,679,926 A | * | 10/1997 | Maloney et al. ............. | 174/652 |
| 5,691,506 A | * | 11/1997 | Miyazaki et al. ............ | 174/652 |
| 5,707,253 A | * | 1/1998 | Matsumoto et al. ......... | 439/610 |
| 6,152,746 A | * | 11/2000 | Brown ......................... | 439/99 |
| 7,044,756 B1 | * | 5/2006 | Asakura et al. ............... | 439/98 |

FOREIGN PATENT DOCUMENTS

| JP | 11-262151 A | 9/1999 |
|---|---|---|
| JP | 2003-115223 A | 4/2003 |

* cited by examiner

*Primary Examiner*—Hae Moon Hyeon
(74) *Attorney, Agent, or Firm*—Sughrue Mion, PLLC

(57) ABSTRACT

An end portion of a shielding layer is inserted between an inner tubular portion and an outer tubular portion of a shield ring by the use of a tubular pushing jig, and in this condition when a shield shell is inserted into the shield ring in a direction opposite to the direction of inserting of the shielding layer, the shield ring is pressed by the shield shell, so that a gap between the inner tubular portion and the outer tubular portion decreases, and the shielding layer is firmly held between the inner and outer tubular portions, thereby achieving a fixed condition of the shielding layer. Namely, the shield ring and the shield shell are fixed to the end portion of the shielding layer.

7 Claims, 4 Drawing Sheets

SHIELD END PROCESSING STRUCTURE

BACKGROUND OF THE INVENTION

1. Field of the Invention

This invention relates to a shield end processing structure in which a shield shell and a shield ring each having electrical conductivity are fixed to an end portion of a tubular shielding layer

2. Related Art

For example, in an electric car or a hybrid car, it is known that electromagnetic waves are generated from a large-current/high-voltage power cable (or wire) connected to a motor mounted on such a vehicle. Therefore, it has been important to provide electromagnetic shielding means which can prevent adverse effects of such electromagnetic waves and also can also prevent adverse effects of electromagnetic waves from the exterior. With respect to the electromagnetic shielding means, the following technique is disclosed in JP-A-2003-115223 Publication mentioned below.

In FIG. 3, reference numeral 1 denotes a shielding layer (braid) formed by interweaving electrically-conductive metal wire elements into a tubular shape. A plurality of wires 2 are passed through the interior of the shielding layer 1. The plurality of wires 2 are covered with the shielding layer 1. The plurality of wires 2 are passed, for example, through a hole 4 formed in a metal casing 3 of a motor. An end portion of the shielding layer 1 is connected and fixed to the metal casing 3 through a shield shell 5 having electrical conductivity. The fixing of the end portion of the shielding layer 1 to the shield shell 5 is effected by a fixing band 6 press-fastened to this end portion. The end portion of the shielding layer 1 is press-clamped to the shield shell 5 over an entire periphery thereof by the press-fastened fixing band 6.

Incidentally, with respect to the fixing of an end portion of a shielding layer to a shield shell, the following technique is also known. JP-A-11-262151 Publication mentioned below discloses a shield end processing structure in which a shield shell 11 and a shield ring 12 each having electrical conductivity are fixed to an end portion of a tubular shielding layer 13 by sliding movement of the shield ring 12 relative to the shield shell 11, as shown in FIG. 4. Outwardly-bent first rectangular piece portions 14 and inwardly-bent second rectangular piece portions 15 are formed at an end portion of the shield shell 11, and are alternately arranged in a circumferential direction.

The end portion of the shielding layer 13 is inserted between the outwardly-bent first rectangular piece portions 14 and the inwardly-bent second rectangular piece portions 15, and then the shield ring 12 is slid, thereby achieving the fixed condition. More specifically, when the shield ring 12 is slid, the outwardly-bent first rectangular piece portions 14 are bent inwardly, so that the end portion of the shielding layer 13 is firmly held between the first rectangular piece portions 14 and the second rectangular piece portions 15, thereby achieving the fixed condition.

Although the above-mentioned JP-A-11-262151 Publication is directed to the shield end processing structure for a shielded cable 16, such a shield end processing structure can be applied also to the structure described above with reference to FIG. 3.

The above conventional techniques have several problems. Namely, in the case of the structure of FIG. 3, the end portion of the shielding layer 1 is press-clamped to the shield shell 5 over the entire periphery thereof, and therefore there has been encountered a problem that unless the fixing band 6 is press-fastened to the end portion of the shielding layer 1 over the entire periphery thereof, the uniform press-clamped condition is not obtained. And besides, the entire-periphery press-fastening can not always be achieved with one press-fastening operation, and this leads to a possibility that the time and labor required for the end processing operation increase.

In the case of the structure of FIG. 4, the fixing of the end portion of the shielding layer 13 by the sliding movement of the shield ring 12 will not increase the time and labor for the end processing operation, and therefore this fixing method is satisfactory in this respect. However, in this structure in which there are provided the outwardly-bent first rectangular piece portions 14 and the inwardly-bent second rectangular piece portions 15, the shielding layer 13 can not be fixed uniformly over the entire periphery thereof (The shielding layer 13 is held between each second rectangular piece portion 15 and the shield ring 12 and also between side portions of any two adjacent first and second rectangular piece portions 14 and 15.). Also, when inserting the end portion of the shielding layer 13, this end portion is liable to be caught by edge portions of the first and second rectangular piece portions to become loose. Furthermore, when the outwardly-bent first rectangular piece portions 14 are bent inwardly, there is a possibility that the end portion of the shielding layer is cut by the first and second rectangular piece portions 14 and 15 as with scissors. Thus, the structure of FIG. 4 has the several problems mentioned above.

SUMMARY OF THE INVENTION

This invention has been made in view of the above circumstances, and an object of the invention is to provide a shield end processing structure in which an end portion of a shielding layer can be fixed uniformly over an entire periphery thereof, and also the fixed condition of the end portion of the shielding layer is good, and furthermore the time and labor required for the end processing operation are not increased.

The above object has been achieved by a shield end processing structure of the invention wherein a shield shell and a shield ring each having electrical conductivity are fixed to an end portion of a tubular shielding layer; characterized in that the shield ring comprises a tubular member folded back intermediate opposite ends thereof such that the shield ring includes an inner tubular portion, an outer tubular portion, and a folded-back portion interconnecting the inner and outer tubular portions, the inner and outer tubular portions and the folded-back portion jointly assuming a generally V-shape in cross-section; and the end portion of the shielding layer is inserted between the inner tubular portion and the outer tubular portion of the shield ring, and in this condition when the shield shell is inserted into the shield ring in a direction opposite to the direction of inserting of the shielding layer, the shield ring is pressed by the shield shell, so that a gap between the inner tubular portion and the outer tubular portion decreases, and the shielding layer is firmly held between the inner and outer tubular portions, thereby achieving a fixed condition of the shielding layer.

The shield end processing structure of the invention, may be further characterized in that a flange portion or an engagement portion which serves as a portion to be pushed by a tubular pushing jig is formed by bending at the end portion of the shielding layer.

In the invention, there is achieved an advantage that particularly because of the features of the configuration of the shield ring, the end portion of the shielding layer can be fixed uniformly over an entire periphery thereof. In addition, there is achieved an advantage that the end portion of the shielding layer can be held in the good fixed condition. Furthermore, there is achieved an advantage that there can be provided the shield end processing structure in which by fixing the shield shell to the shield ring by inserting the former into the latter, the time and labor required for the end processing operation are not increased as is the case with the conventional structure utilizing the sliding movement.

In the invention, there is achieved an advantage that the efficiency of the operation can be enhanced.

DETAILED DESCRIPTION OF THE PREFERRED EMBODIMENTS

Figure 1:
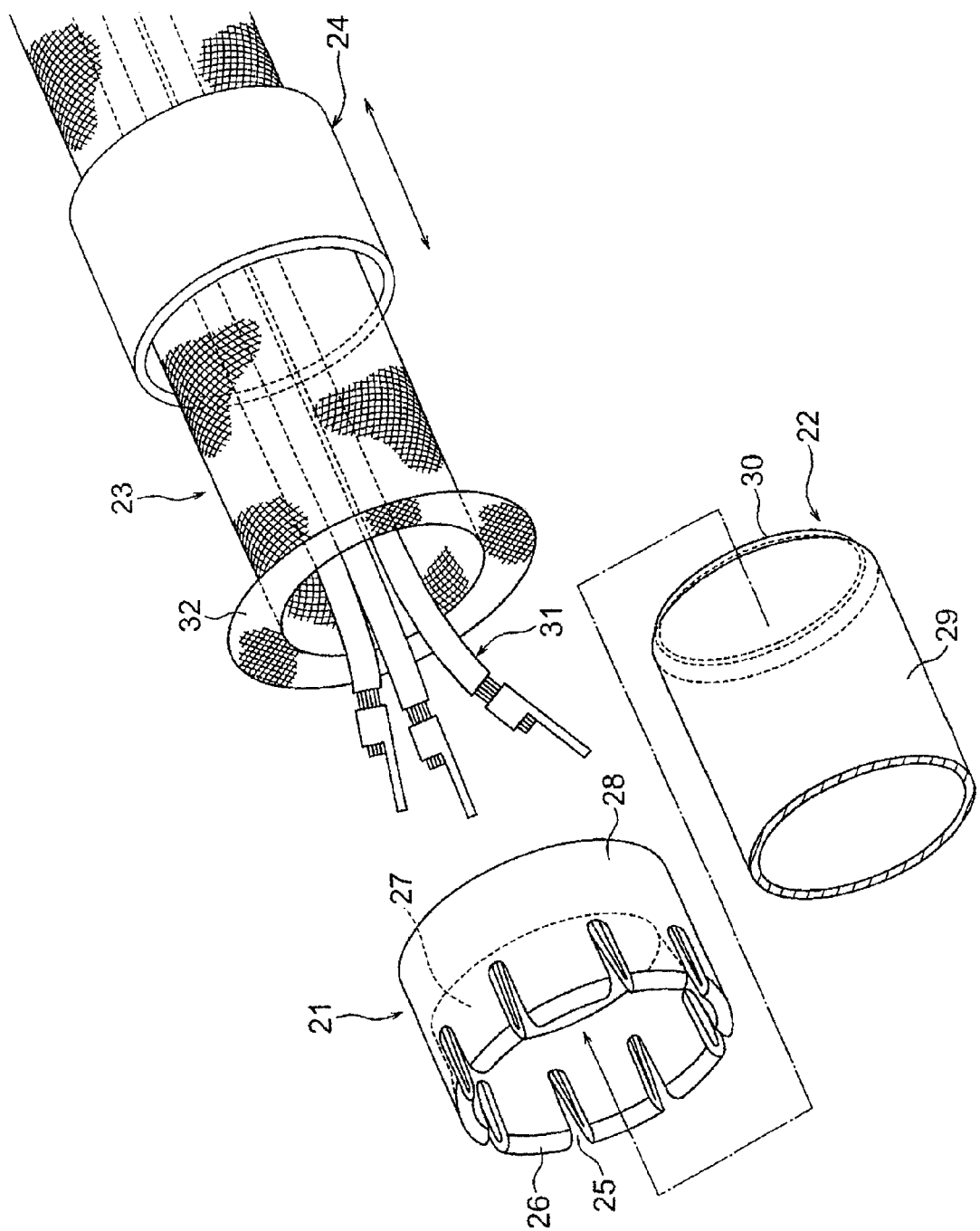
FIG. 1 is an exploded perspective view showing one preferred embodiment of a shield end processing structure of the present invention.
Figure 2A:
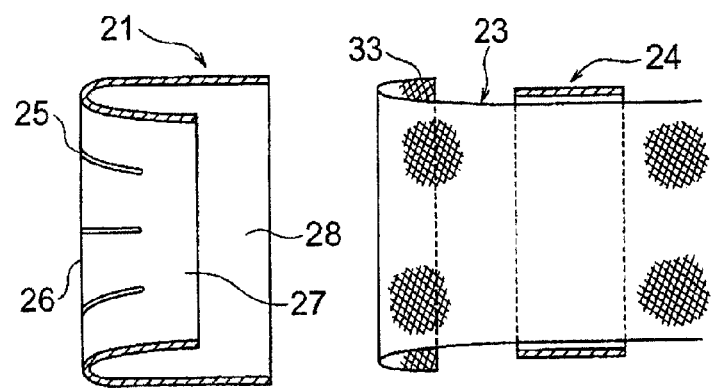
FIGS. 2A to 2C are views explanatory of an operation for fixing an end portion of a shielding layer.
Figure 2B:
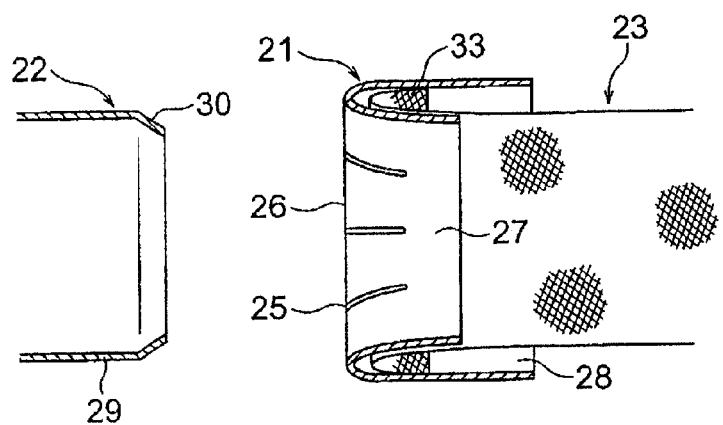
Figure 2C:
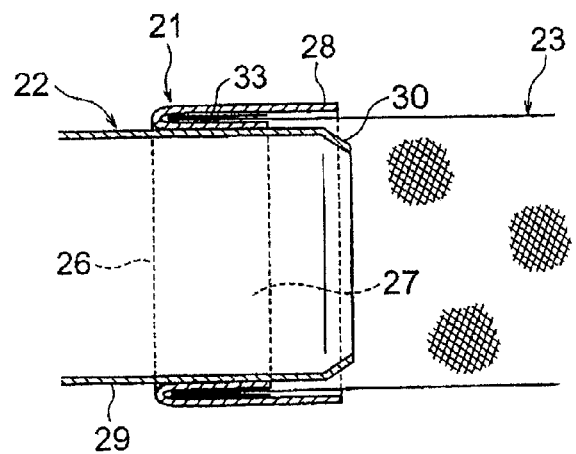
Figure 3:
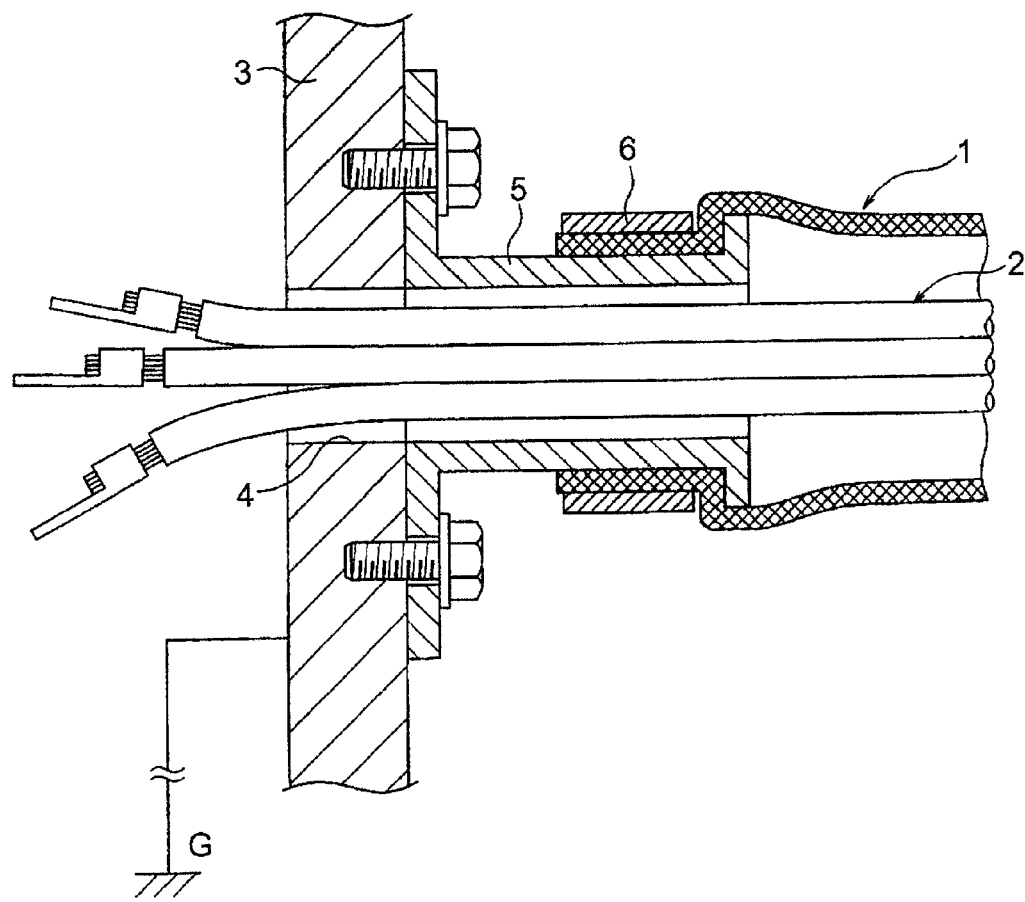
FIG. 3 is a cross-sectional view showing a conventional shield end processing structure.
Figure 4:
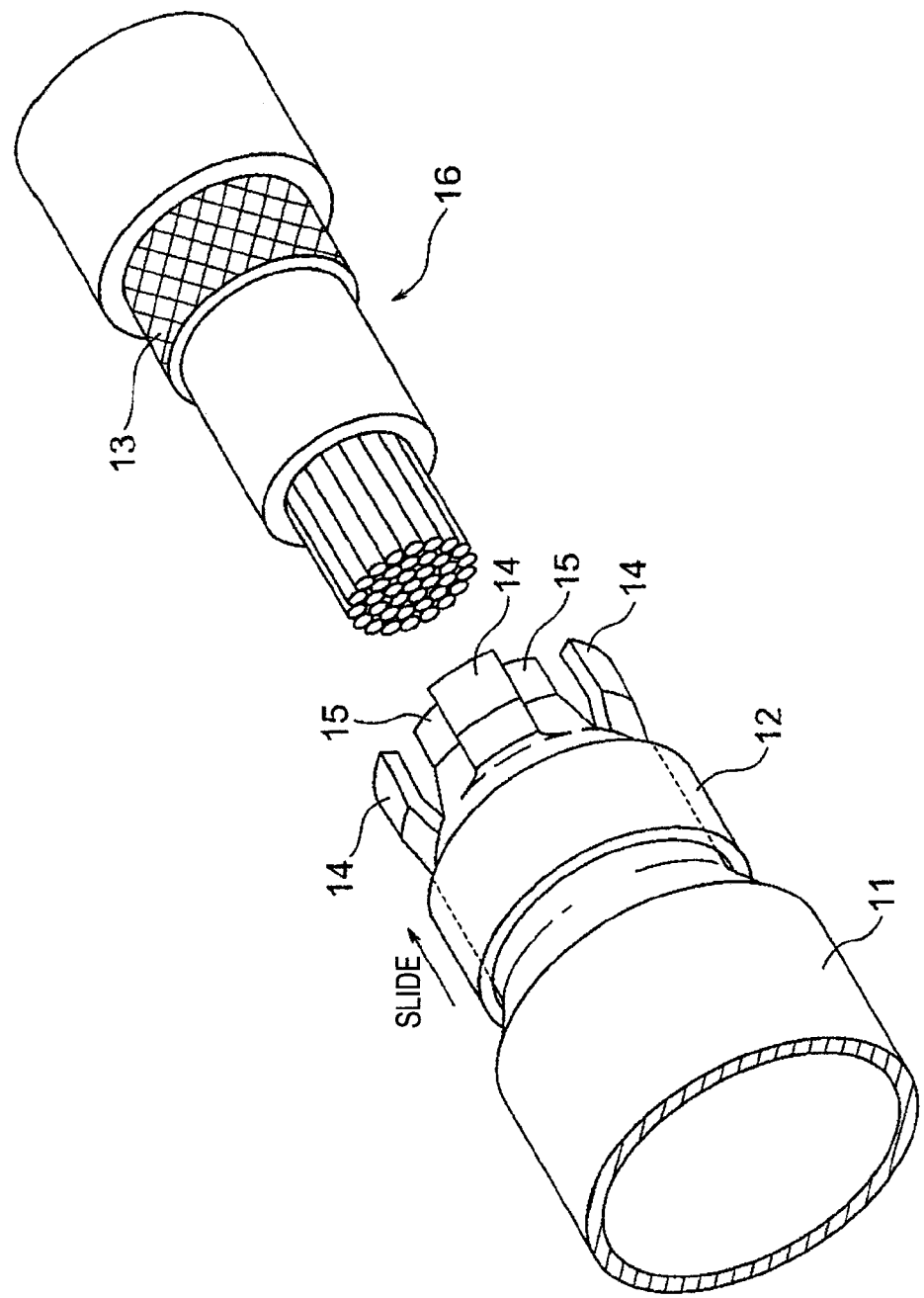
FIG. 4 is a perspective view showing another conventional shield end processing structure.

The present invention will now be described with reference to the drawings. FIG. 1 is an exploded perspective view showing one preferred embodiment of a shield end processing structure of the invention. FIGS. 2A to 2C are views explanatory of an operation for fixing an end portion of a shielding layer.

In FIG. 1, reference numeral 21 denotes a shield ring made of electrically-conductive metal. Reference numeral 22 denotes a shield shell made of electrically-conductive metal as is the case with the shield ring 21. The shield ring 21 and the shield shell 22 jointly provide a structure (shield end processing structure) in which by inserting the shield shell 22 into an inner periphery of the shield ring 21, the shield ring 21 and the shield shell 22 are fixed to the end portion of the tubular shielding layer 23. Reference numeral 24 denotes a pushing jig 24 of a tubular shape used for inserting the end portion of the shielding layer 23 into the shield ring 21. The constituent members will be described below with reference to FIGS. 1 and 2.

The shield ring 21 comprises a tubular member having a plurality of slits 25 formed therein and arranged at equal intervals in a circumferential direction, and this tubular member is inwardly folded or bent back intermediate opposite ends thereof (that is, at a portion thereof having the slits 25) such that the shield ring 21 of an illustrated configuration includes an inner tubular portion 27, an outer tubular portion 28, and a folded-back portion 26 interconnecting the inner and outer tubular portions 27 and 28, the inner and outer tubular portions 27 and 28 and the folded-back portion 26 jointly assuming a generally V-shape in cross-section. The plurality of slits 25 are formed in the shield ring 21 (that is, the tubular member), and therefore the tubular member can be inwardly folded back intermediate the opposite ends thereof.

The tubular member is inwardly folded back at the portion thereof having the slits 25, and therefore the folded-back portion 26 is divided into a plurality of sections by these slits 25. The folded-back portion 26 has a curved surface formed as a result of folding-back of the tubular member. The shield shell 22 can be guided into the inner tubular portion 27 by this curved surface. The inner tubular portion 27 as well as the outer tubular portion 28 is formed into a generally cylindrical shape. In this embodiment, a length of the inner tubular portion 27 in the axial direction of the shield ring 21 is smaller than a length of the outer tubular portion 28 (However, this is merely one example.). The inner tubular portion 27 and the outer tubular portion 28 are formed such that a space or gap between the two tubular portions 27 and 28 is increasing gradually in a direction away from the folded-back portion 26. The shield ring 21 is formed into a generally crown-shape.

The shield shell 22 includes an insertion cylindrical portion 29 for insertion into the inner tubular portion 27 of the shield ring 21, and a portion (not shown) for being connected and fixed to a grounding member. An outer diameter of the insertion cylindrical portion 29 is slightly smaller than the diameter of the folded-back portion 26 of the shield ring 21, and also is slightly larger than an inner diameter of an opening portion of the inner tubular portion 27 of the shield ring 21. A tapering portion 30 is formed at a distal open end of the insertion cylindrical portion 29. Therefore, the distal end portion of the insertion cylindrical portion 29 is tapering (that is, gradually decreasing in diameter) because of the provision of the tapering portion 30. The tapering portion 30 is provided for facilitating the insertion of the insertion cylindrical portion 29 into the inner tubular portion 27.

The shielding layer 23 is a so-called braid formed by interweaving electrically-conductive metal wire elements into a tubular shape. A plurality of wires 31 can be passed through the inner periphery of this shielding layer 23. The shielding layer 23 is provided for the purpose of preventing an influence of electromagnetic waves from being exerted on the surroundings and others. A flange portion 32 is formed by bending at the end of the shielding layer 23, and this flange portion 32 serves as a portion to be pushed by the tubular pushing jig 24 (Instead of the illustrated flange portion 32, an engagement portion 33 (see FIG. 2) to be engaged by the tubular pushing jig 24 may be formed by bending or folding back the end portion of the shielding layer 23. In the case where the tubular pushing jig 24 is not used, the formation of the flange portion 32 or the engagement portion 33 can be omitted if so desired.).

The tubular pushing jig 24 is a cylindrical member made of metal or a synthetic resin, and can slide on and along an outer peripheral surface of the shielding layer 23. An outer diameter of the tubular pushing jig 24 is slightly larger than an outer diameter of the opening portion of the inner tubular portion 27 of the shield ring 21, and is also slightly smaller than an inner diameter of an opening portion of the outer tubular portion 28. A thickness of the tubular pushing jig 24 is determined, taking the outer diameter of the opening portion of the inner tubular portion 27 and the inner diameter of the opening portion of the outer tubular portion 28 into consideration (For example, the tubular pushing jig 24 may be formed such that the thickness of that portion thereof to be inserted into the shield ring 21 is gradually decreasing toward the distal end thereof).

The tubular pushing jig 24 is provided for the purpose of facilitating the insertion of the end portion of the shielding layer 23 into the shield ring 21 (If the end portion of the shielding layer 23 can be easily inserted into the shield ring 21 without the use of the tubular pushing jig 24, the use of the tubular pushing jig 24 is not imperative.). The tubular pushing jig 24 is effective in preventing the end portion of the shielding layer 23 from becoming loose (that is, from being damaged) when inserting this end portion into the shield ring 21.

In the above construction, the end portion of the shielding layer 23 is inserted between the inner tubular portion 27 and the outer tubular portion 28 of the shield ring 21, using the tubular pushing jig 24 (see FIGS. 2A and 2B), and in this condition when the shield shell 22 is inserted into the shield ring 21 in a direction opposite to the direction of inserting of the shielding layer 23, the shield ring 21 is pressed by the shield shell 22, so that the gap between the inner tubular portion 27 and the outer tubular portion 28 decreases, and the end portion of the shielding layer 23 is firmly held between the two tubular portions 27 and 28 (see FIG. 2C). Thus, the fixed condition of the shielding layer 23 is achieved. Namely, the shield ring 21 and the shield shell 22 are fixed to the end portion of the shielding layer 23.

The establishment of this fixed condition will be described in more detail. When the flange portion 32 (or the engagement portion 33) formed at the end portion of the shielding layer 23 is inserted between the inner tubular portion 27 and the outer tubular portion 28 of the shield ring 21, the thus inserted flange portion 32 (or engagement portion 33) tends to be restored into its initial condition, and therefore is prevented from being disengaged from the shield ring 21. In other words, the end portion of the shielding layer 23 is held in a provisionally-retained condition. In this condition, when the shield shell 22 is inserted into the shield ring 21, the end portion of the shielding layer 23 is firmly held between the inner tubular portion 27 and the outer tubular portion 28 of the shield ring 21 with a uniform force exerted over the entire periphery thereof.

As described above with reference to FIGS. 1 and 2, there is achieved an advantage that particularly because of the features of the configuration of the shield ring 21, the end portion of the shielding layer 23 can be fixed uniformly over the entire periphery thereof. In addition, there is achieved an advantage that the fixed condition of the end portion of the shielding layer 23 can be made much better as compared with the conventional shield end processing structures. Furthermore, there is achieved an advantage that there can be provided the shield end processing structure in which by fixing the shield shell 22 to the shield ring 21 by inserting the former into the latter, the time and labor required for the end processing operation are not increased as is the case with the conventional structure utilizing the sliding movement.

In the present invention, various modifications can be made without departing from the subject matter of the invention.

What is claimed is:

1. A shield end processing structure comprising:
   a shield shell having electrical conductivity; and
   a shield ring having electrical conductivity,
   wherein said shield shell and said shield ring are fixed to an end portion of a tubular shielding layer,
   wherein said shield ring includes a tubular member folded inwardly at one end thereof such that said shield ring includes an inner tubular portion, an outer tubular portion, and a folded-back portion interconnecting said inner and outer tubular portions, said inner and outer tubular portions and said folded-back portion jointly assuming a generally V-shape in cross-section;
   wherein the end portion of said shielding layer is inserted between said inner tubular portion and said outer tubular portion of said shield ring, and in this condition when said shield shell is inserted into said shield ring in a direction opposite to the direction of inserting of said shielding layer, said shield ring is pressed by said shield shell, so that a gap between said inner tubular portion and said outer tubular portion decreases, and said shielding layer is firmly held between said inner and outer tubular portions, thereby achieving a fixed condition of said shielding layer, and
   wherein said inner tubular portion tapers inwardly starting from said folded-back portion such that said gap between said inner tubular portion and said outer tubular portion gradually increases from said folded-back portion to an end of said inner tubular portion.

2. The shield end processing structure according to claim 1, wherein a flange portion or an engagement portion which serves as a portion to be pushed by a tubular pushing jig is formed by bending the end portion of said shielding layer.

3. The shield end processing structure according to claim 1, wherein the end portion of said shielding layer contains a flange portion.

4. The shield end processing structure according to claim 1, wherein said folded-back portion of said shield ring contains a plurality of slits along a circumference thereof such that said folded-back portion is divided into a plurality of sections.

5. The shield end processing structure according to claim 1, wherein said folded-back portion is curved.

6. The shield end processing structure according to claim 1, wherein a length of said inner tubular portion in an axial direction of said shield ring is smaller than a length of said outer tubular portion.

7. The shield end processing structure according to claim 1, wherein an outer diameter of said shield shell is larger than an inner diameter of said inner tubular portion of said shield ring.

* * * * *